INVENTORS
John R. Glass
David Liederman

By Paul H. Heller

United States Patent Office 3,432,403
Patented Mar. 11, 1969

3,432,403
METHOD FOR DETERMINING COMPONENTS IN HYDROCARBON STREAMS
John R. Glass, Mickleton, N.J., and David Liederman, Anvil Points, Colo., assignors to Mobil Oil Corporation, a corporation of New York
Filed Jan. 14, 1965, Ser. No. 425,528
U.S. Cl. 204—1                8 Claims
Int. Cl. G01n 27/00; B01k 1/00

ABSTRACT OF THE DISCLOSURE

Electroreactive components in a nonconducting liquid stream are determined by continuously conveying a nonaqueous electrolyte from a reference electrode through a porous separator to a detecting electrode in contact with the separator. The nonconducting liquid stream is conveyed past the detecting electrode and the flow of the electrolyte is maintained at a sufficient pressure to prevent the passage of the nonconducting liquid stream through the porous separator. The potential across the electrode is monitored to provide a representation of the electroreactive components content in the nonconducting liquid stream.

---

This invention relates to a novel method for determining the presence of components in a process stream. More particularly, this invention is directed to a method for continuously monitoring an electrically nonconducting process stream to detect trace components therein. Briefly, this invention consists of a detecting cell wherein a reference electrode and a detecting electrode are separated by a porous member, electrolyte is continuously conveyed from said reference electrode to the detecting electrode, a process stream is conveyed past said detecting electrode and the concentration of a desired component is reflected by the change in potential across the two electrodes. This invention has found particular utility in quantitatively determining the presence of sulfhydryl or hydroxyl ions in a hydrocarbon stream.

The determination of trace components in refinery hydrocarbon streams is usually accomplished by laboratory analysis of withdrawn samples. The sampling technique is, of course, subject to the deficiencies of any batch-method analysis and must be scheduled frequently to ensure reliable results. A continuous analysis method is the only sure way to pin-point when corrective action should be taken; but laboratory costs of such a procedure would be excessive. However, even in view of the great need for a method for continuous analysis of hydrocarbon streams none has been developed which is entirely satisfactory.

The conventional method for determining the presence of mercaptans in a hydrocarbon stream is by titration. Titration is dependent upon the measurement of the amount of a standardized solution necessary to neutralize or precipitate an unknown quantity of a component in a sample. The measurement of mercaptan content is usually accomplished by diluting a measured amount of the sample with a polar solvent containing an electrolyte and adding a test solution of a reagent of known concentration in known quantity sufficient to produce a stoichiometric reaction with the mercaptan, i.e., bringing the test solution to an end point. The concentration of the mercaptan can then be determined when the concentration and volume of the added reagent is known. This method requires the preparation, standardization, storage, controlled introduction and precise measurement of reagents. This obviously involves the expenditure of considerable time and effort upon the part of a laboratory technician, requires the use of large quantities of an electrolyte containing solvent, and involves a considerable delay between the occurrence of a change in the process and detection of that change. Improvements upon this method have been directed toward automating the basic concept of a batch titration system. For example, electrical methods have been devised for determining the titration end point. In one prior art embodiment silver ions are generated between metal electrodes in a titration cell. These silver ions react with mercaptans in the sample. The mercaptan content is proportional to the quantity of electricity required to generate ions to react with the mercaptans. For example, see Leisey Patent No. 2,928,774. Prior art methods for caustic determination have followed a similar course.

It is therefore an object of this invention to overcome the above drawbacks of the prior art methods and to provide an improved method for the continuous determination of trace components in a nonconducting process stream.

It is a further object of this invention to provide improved methods for the continuous determination of mercaptan and caustic components in a hydrocarbon stream.

The apparatus for this invention comprises a porous diaphragm, a detecting electrode in contact with said diaphragm, a reference electrode immersed in an electrolyte on the other side of said diaphragm, means to continuously force said electrolyte through said porous diaphragm to the detecting electrode side, means to convey a nonconducting sample stream past said detecting electrode, and means to determine a potential across the two electrodes, as the potential changes in accordance with the concentration of the component to be detected in the sample stream. The process of this invention comprises maintaining the pressure of the electrolyte on the reference side at a sufficient level to prevent the sample stream from entering the reference side but not so high as to prevent the sample stream from contacting the liquid film of electrolyte on the surface of the detecting electrode. In other words only a thin liquid film of electrolyte should be maintained on the surface of the detecting electrode, presumably to enable ions from the sample stream to migrate to the detecting surface. Thus one feature of this invention involves the maintenance of a continuous stream of electrolyte from the reference electrode, which will be explained in further detail in connection with particular embodiments of this invention.

Two particular embodiments of this invention comprise the determination of sulfhydryl and hydroxyl ions in a hydrocarbon stream. It is well known that a metal electrode develops a potential in a solution of its own ions, the potential being logarithmically proportional to the ion activity. For an ideal electrode, the potential at 25° C. is given by the Nernst Equation:

$$E = \frac{0.059}{N} \log M + E_0$$

where E equals the electrode potential in volts, M equals the ion activity in moles per liter and $E_0$ equals the standard potential (potential of the electrode in a solution of ions at unit activity), N equals the oxidation-reduction electron change. Since the response is logarithmic, the electrode will be very sensitive to trace changes in ion activity. Although the ion activity is different in non-aqueous electrolytes from the activity in aqueous electrolytes, the principle of logarithmic dependence of potential on activity holds well.

In the detection of mercaptans, the following reactions are of interest: $Ag^0 \rightleftharpoons Ag^+ + e^-$ (at the electrode); $Ag^+ + RS^- \rightleftharpoons AgSR$ (in the solution). The above equations represent a system comprising silver electrodes. Silver has a tendency to dissolve in a solution, leaving a negative charge on the electrode. If mercaptan is present, the silver ion concentration is reduced by precipitation as the mercaptide. As a consequence, the degree of dissolution of the silver electrode increases, making the electrode more negative. This detection system responds when the thin layer of electrolyte adjacent to the silver wire detector extracts mercaptan from the sample stream.

In an analogous system for the determination of hydroxyl ions in a sample stream, the following equation is pertinent: $4OH^- \rightleftharpoons 4e + O_2 + 2H_2O$. Caustic in a sample stream enters the electrolyte at the electrode surface and generates a change in potential across the two electrodes. Any electroreactive component in a nonconducting fluid may be detected by this invention. Other examples are hydrogen sulphide, acids, alkalies, oxidizing agents, reducing agents and metallic ions.

This invention will be further illustrated in the accompanying drawings wherein like characters of reference indicate like parts in the drawings.

Figure 1:
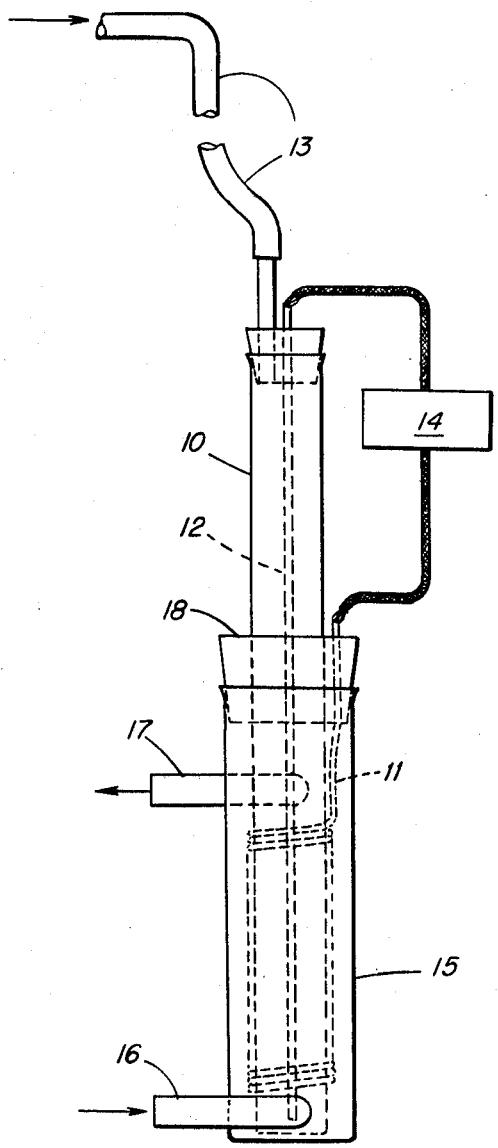
FIGURE 1 is a schematic illustration of a cell assembly.

FIGURE 1 illustrates a porous diaphragm 10, in the form of a container, a detecting electrode, 11, wrapped around the diaphragm and an internal or reference electrode 12 positioned within the diaphragm. Electrolyte is introduced at inlet 13, which represents a conduit from which a supply of electrolyte is provided from a reservoir. A recorder 14 monitors the change in potential across electrodes 11 and 12. The apparatus as depicted may be used directly in a sample stream. In the above drawings, however, the sample stream is conveyed to a holding container 15 by conduit 16; the sample is withdrawn at 17. The holding container is sealed to the cell assembly by means of stopper 18.

The porous diaphragm may be made of porcelain or similar materials which will contain the electrolyte and provide for a sufficient flow therethrough to maintain a film of electrolyte on the detecting electrode. Other suitable diaphragms may be fashioned from clay or filters made from paper, glass, nylon, quartz, Teflon or plastic. The detecting electrode is made from wire of a suitable diameter, such as 0.005 to 0.02 inch, which is tightly wrapped around the porous cylinder. All porous areas of the electrode container, except the area covered by the coil of detecting electrode, should be sealed to prevent unnecessary expenditure of the electrolyte. Other shapes of diaphragms and electrodes may be used, for example, a perforated disc electrode is suitable for a flat porous diaphragm.

The composition of the electrodes and electrolytes will, of course, be varied in accordance with the nature of the component which is to be analyzed. For example, the reference electrode may be a silver-silver chloride, calomel, or other known composition compatible with the electrolyte. In the detection of mercaptans the detecting electrode may be silver, mercury, copper or other metal forming an insoluble or slightly soluble salt with mercaptans. The electrolyte will, of course, suitably match the composition of the electrodes. It should contain a component such as chloride or bromide ion that will give a definite potential with the reference electrode. It should contain a compatible cation such as lithium, or a substituted ammonium ion to ensure sufficient conductivity. In the determination of substances such as mercaptan, which can be acidic or basic, it may be desirable to incorporate a buffer in the electrolyte. Salts of weak acids, and the free acid or salts of weak bases and the free base may be used, for example: acetic acid and lithium acetate, or triethanolamine and triethanolammonium bromide. In the case of the determination of hydroxyl or hydrogen ion a poising agent such as oxygen or quinhydrone may be used. These salts may be in an isopropanol solvent or similar polar solvent compatible with the hydrocarbon stream and suitable as an electrolyte. For the detection of caustic components the electrodes may be nickel, platinum, platinum-iridium or other inert metals. The general composition of the electrolyte is a salt and a polar solvent having a high reciprocal solubility with the nonconducting fluid. A salt which will give a minimum of interference with this intersolubility should be used. The salt and its concentration must be chosen so that sufficient conductivity is obtained but phase separation does not occur.

EXAMPLE I

Figure 2:
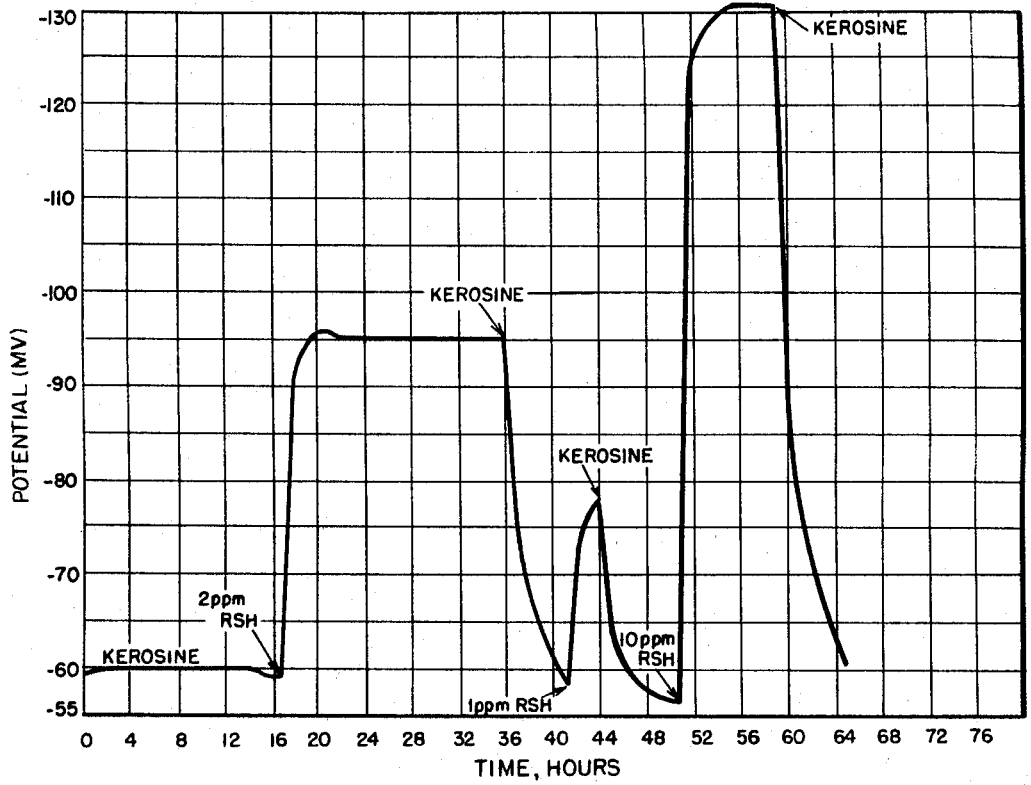
FIGURE 2 is a graph of a specific embodiment of this invention directed to the determination of mercaptans in a sample stream.

This example is directed to the determination of mercaptans with the electrode system illustrated in FIGURE 1. A porous porcelain filter cylinder with an average pore diameter of 0.65 to 0.80$\mu$ was tightly wrapped with 300 cm. of 0.5 mm. (0.02″) diameter silver wire which was used as the detecting electrode. A silver-silver chloride reference electrode, 1.7 mm. O.D., was used with an electrolyte composed of lithium perchlorate (0.05 molar) and lithium chloride (0.01 molar) in isopropanol. Concentrations of 0.01 molar and 0.001 molar, respectively, were also found suitable. An elevated reservoir was used to maintain the electrolyte at a positive pressure inside the cylinder. A head of 60 cm. was found particularly suitable. With this head the flow of electrolyte through the cylinder wall was only ½ milliliter per hour. The porous areas of the filter cylinder which were not covered by the coil of silver wire were sealed with Tygon (polyvinyl chloride) paint. The electrode system was connected directly to a Sargent SR recorder of 10,000 to 50,000 ohm input response. The recorder was used on the 0–125 mv. range. Kerosine containing a known amount of butyl mercaptan was directed through the apparatus shown in FIGURE 1. The potential was independent of the flow rate through the cell which was varied from 5 to 14 ml. per minute. FIGURE 2 shows a plot of electrode response for various mercaptan concentrations taken over a continuous period of 65 hours. The stability for both lower and higher levels was excellent; the variation of voltage was less than 1 mv. in a 16 hour period. When a sample stream containing one mercaptan concentration was changed to another, the electrode began to respond in one or two minutes, but the time for equilibration was longer. The time-constant for equilibration was decreased by about 50% when the 0.20 inch detecting electrode was replaced by an 0.005 inch wire. This system was found to be sensitive to a few tenths of a p.p.m. of mercaptan and quantitative up to at least 160 p.p.m.

A suitable absorber, to prevent potential interference from hydrogen sulphide, may be comprised of 8 grams of silica gel impregnated with 27% of a 12% cadmium sulfate solution. This absorber, in the sample feed line, removed H₂S completely, without affecting the mercaptan content.

Results with gasoline indicated that the apparatus functioned well in other types of streams.

EXAMPLE II

Figure 3:
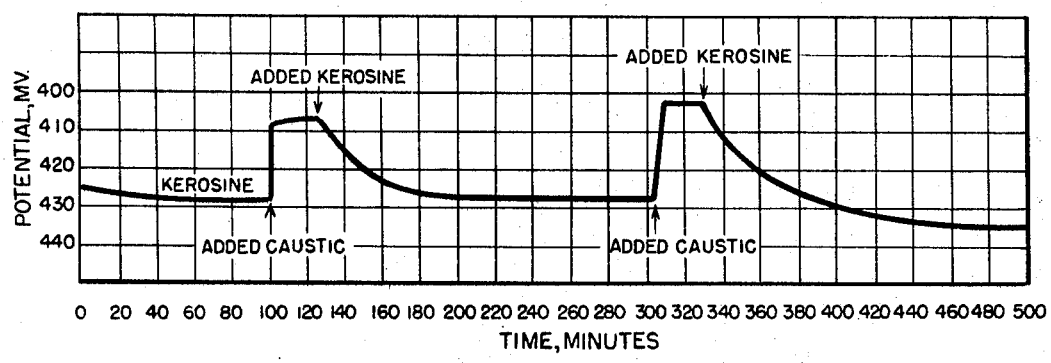
FIGURE 3 is a graph of a specific embodiment of this invention directed to the determination of caustic in a sample stream.

This example is directed to the determination of a caustic component by means of the apparatus shown in FIGURE 1. A porous porcelain cylinder with an average pore diameter of 0.65 to 0.80$\mu$ was tightly wound with 0.013 inch diameter platinum wire. The internal reference electrode was made of silver-silver chloride. The electrolyte was 0.01 molar lithium chloride and 0.05 molar lithium perchlorate in isopropanol, and was at a head of 50 cm. The sample kerosine was trickled into a funnel before it entered the cell so that it would be saturated with air to maintain a constant oxygen content. The kerosine containing 1.8 p.p.m. caustic (KOH) was maintained at a flow rate of 31 ml./min. The output of the recording instrument across the electrodes is illustrated in FIGURE 3.

Further experiments similar to the above were conducted successfully as indicated by the following table.

| Electrolyte composition in isopropanol solvent | pH measured using Clark and Lubs indicators | Sensitivity change in millivolts for doubling of mercaptan concentrations |
| --- | --- | --- |
| 0.01 M Li Br<br>0.01 M Li salicylate<br>0.01 M salicylic acid | 3.1 | 2.2 |
| 0.01 M Li Br<br>0.01 M Li acetate<br>0.01 M acetic acid | 4.7 | 14.3 |
| 0.01 M Li Br<br>0.01 M Li trichlorophenolate<br>0.01 M trichlorophenol | 6.0 | 17.7 |

In the illustrated examples a constant flow rate was maintained through the porous diaphragm. Thus, this method and apparatus is distinctly different from a conventional potential cell wherein both reference and sample solutions are electrolytes. In such systems each electrode is surrounded by its own conducting electrolytic solution within which electrons are transported. It is well recognized that a means must be provided to maintain contact for the transport of ions. This is accomplished by inclosing at least one electrode and its accompanying solution in a porous cup which permits the migration of ions while preventing convection. In contrast this invention provides a means and method for the determination of trace electroreactive components in a nonconducting fluid wherein a single electrolyte, maintained at a constant concentration at a reference electrode, is forced through a diaphragm to a detecting electrode where the component to be analyzed diffuses from a nonconducting sample into the electrolyte film on the detecting electrode to change the potential of the system.

This invention has been described in terms of specific embodiments set forth in detail, but it should be understood that these are by way of illustration only and that the invention is not necessarily limited thereto. Alternative constructions will become apparent to those skilled in the art in view of this disclosure and, accordingly, modifications of the apparatus and process disclosed herein are to be contemplated within the spirit of this invention.

We claim:

1. In a method for the continuous determination of electroreactive components in a nonconducting liquid stream by means of a detecting electrode, a reference electrode, a porous separator between said electrodes and in contact with said detecting electrode, the improvement which comprises continuously conveying a nonaqueous electrolyte from said reference electrode to said detecting electrode at a sufficient pressure to maintain a flow of said electrolyte through said porous separator, conveying said nonconducting liquid stream past said detecting electrode and monitoring the potential across said electrodes which changes in accordance with the content of the electroreactive component in said nonconducting liquid stream.

2. In a method for the continuous determination of mercaptan components in a liquid hydrocarbon stream by means of a detecting electrode, a reference electrode, a porous separator between said electrodes and in contact with said detecting electrode, the improvement which comprises continuously conveying a nonaqueous electrolyte from said reference electrode to said detecting electrode at a sufficient pressure to maintain a flow of said electrolyte through said porous separator, conveying said liquid hydrocarbon stream past said detecting electrode and monitoring the potential across said electrodes which changes in accordance with the content of the mercaptan component in said liquid hydrocarbon stream.

3. In a method for the continuous determination of hydroxyl ions in a liquid hydrocarbon stream by means of a detecting electrode, a reference electrode, a porous separator between said electrodes and in contact wtih said detecting electrode, the improvement which comprises continuously conveying a nonaqueous electrolyte from said reference electrode to said detecting electrode at a sufficient pressure to maintain a flow of said electrolyte through said porous separator conveying said liquid hydrocarbon stream past said detecting electrode and monitoring the potential across said electrodes which changes in accordance with the content of the hydroxyl ions in said liquid hydrocarbon stream.

4. A method for continuously determining the mercaptan content of a liquid hydrocarbon stream which comprises generating a potential from a silver detecting electrode wrapped around a porous container and a silver-silver chloride reference electrode in a non-aqueous electrolyte of lithium chloride, lithium perchlorate and isopropanol in said porous container, continuously conveying said nonaqueous electrolyte from said reference electrode to said detecting electrode at a sufficient pressure to maintain a flow of said electrolyte through said porous container, conveying said liquid hydrocarbon stream past said detecting electrode and monitoring the potential across said electrodes which changes in accordance with the content of the mercaptan component in said liquid hydrocarbon stream.

5. A method for continuously determining the hydroxyl ion content of a liquid hydrocarbon stream which comprises generating a potential from a platinum detecting electrode wrapped around a porous container and a silver-silver chloride reference electrode in a nonaqueous electrolyte of lithium chloride, lithium perchlorate and isopropanol in said porous container, continuously conveying said nonaqueous electrolyte from said reference electrode to said detecting electrode at a sufficient pressure to maintain a flow of said electrolyte through said porous container, conveying said liquid hydrocarbon stream past said detecting electrode and monitoring the potential across said electrodes which changes in accordance with the content of the hydroxyl ion in said liquid hydrocarbon stream.

6. A method for the continuous determination of mercaptans in a liquid hydrocarbon stream which comprises conveying an electrolyte comprising a salt, a buffer and a polar solvent, from a reference electrode and through a porous diaphragm to a detecting electrode in contact with said diaphragm, conveying said liquid hydrocarbon stream past said detecting electrode, and monitoring the potential across said electrodes which changes in accordance with the mercaptan content of said liquid hydrocarbon stream.

7. The method of claim 6, wherein said electrolyte comprises lithium bromide, isopropanol, and a buffer selected from the group consisting of lithium salicylate and salicylic acid, lithium acetate and acetic acid, and lithium trichlorophenolate and trichlorophenol.

8. A method for the continuous determination of hydroxyl ion components in a liquid hydrocarbon stream which comprises conveying an electrolyte comprising a salt, a poising agent and a polar solvent, from a reference electrode and through a porous diaphragm to a detecting electrode in contact with said diaphragm, conveying said liquid hydrocarbon stream past said detecting electrode, and monitoring the potential across said electrodes which changes in accordance with the hydroxyl ion content of said liquid hydrocarbon stream.

References Cited

UNITED STATES PATENTS

| | | | |
|---|---|---|---|
| 2,651,612 | 9/1953 | Haller | 204—195 |
| 2,928,774 | 3/1960 | Leisey | 204—195 |
| 3,005,758 | 10/1961 | Spracklen et al. | 204—195 |
| 3,028,317 | 4/1962 | Wilson et al. | 204—1.1 |
| 3,038,848 | 6/1962 | Brewer et al. | 204—195 |
| 3,223,608 | 12/1965 | Hersch | 204—195 |
| 3,315,270 | 4/1967 | Hersch | 204—195 |
| 3,329,599 | 7/1967 | Brewer | 204—195 |

JOHN H. MACK, *Primary Examiner.*

T. TUNG, *Assistant Examiner.*

U.S. Cl. X.R.

204—195, 260, 263